Jan. 25, 1955  A. E. W. JOHNSON ET AL  2,700,233
COMBINATION BULLDOZER AND ROAD SCRAPER
Filed Jan. 28, 1948  4 Sheets-Sheet 1

Inventors
Arnold F. W. Johnson
Melville J. Mitchell
Paul O. Pippel
Atty.

Jan. 25, 1955     A. E. W. JOHNSON ET AL     2,700,233
COMBINATION BULLDOZER AND ROAD SCRAPER
Filed Jan. 28, 1948     4 Sheets-Sheet 2

Inventors.
Arnold E. W. Johnson
Melville J. Mitchell
Paul O. Pippel
Atty.

Jan. 25, 1955  A. E. W. JOHNSON ET AL  2,700,233
COMBINATION BULLDOZER AND ROAD SCRAPER
Filed Jan. 28, 1948  4 Sheets-Sheet 4

Inventors
Arnold E. W. Johnson
Melville J. Mitchell
Paul O. Pippel
Atty.

United States Patent Office 2,700,233
Patented Jan. 25, 1955

2,700,233

COMBINATION BULLDOZER AND ROAD SCRAPER

Arnold E. W. Johnson, Oak Park, and Melville J. Mitchell, Highland Park, Ill., assignors to International Harvester Company, a corporation of New Jersey Application January 28, 1948, Serial No. 4,756

2 Claims. (Cl. 37—144)

This invention relates to earth moving implements and particularly to an earth moving implement adapted for mounting upon a tractor. More specifically the invention concerns a tractor mounted earth scraping blade which may be utilized optionally for bulldozing or grading and the like.

The present invention contemplates the provision of an attachment for a farm tractor which includes an earth scraping blade adapted to be mounted upon the front of a tractor to function as a bulldozer for moving dirt, snow and other loads as well as for preparing ditches, planting beds and the like. The connections of the implement to the tractor are simplified so that the scraping blade may be readily attached thereto and the blade is caused to serve a dual purpose by providing means for attaching the tool so that the blade is carried midway of the tractor between the front and the rear wheels to serve for grading purposes. For the movement of loads it is of course preferable that the blade be mounted in front of the tractor, but for grading purposes better control of the implement is required and this is provided by a mounting under the tractor between the front and the rear wheels.

An important object of the invention is therefore the provision of a simplified and improved earth moving implement.

Another object of the invention is to provide, in combination with a tractor, an earth moving implement which is adapted to be connected to the tractor in two different positions to perform dual functions. By providing an implement which is capable of performing several functions, the farmer or other operator is saved the expense normally incurred by an investment in several different implement attachments for his tractor.

Another object of the invention is to provide a simple and economical earth scraping attachment for a tractor wherein a double edge blade is provided which may be readily and quickly inverted so that either cutting edge may be placed in operation.

A further object of the invention is the provision of an improved earth scraping attachment for a tractor including as a unit a rectangular frame to which a scraper blade is attached for adjustment to several positions and which incorporates pivot means by which the implement may be attached to the tractor for vertical swinging movement about the pivot means between operating and transport positions.

Another object of the invention is to provide in combination with a tractor a pair of longitudinally spaced draft connections supported by the tractor body, to the forwardmost of which an earth scraping blade may be attached to extend forwardly from the draft member below the front axle and between the front wheels of the tractor to a position in advance thereof to function as a bulldozer or the like, and to the rearmost draft member of which the implement may be attached to extend forwardly to a position between the front and rear wheels of the tractor and below the body thereof to perform grading and like operations.

Other objects and advantages of this invention will become clear from the following detailed description when read in conjunction with the accompanying drawings, wherein:

Figure 5 is a detail of the forwardmost draft member or connecting bracket by which the implement is connected to the tractor to be propelled thereby; and Figure 6 is a rear elevation of the earth scraping blade.

Figure 2:
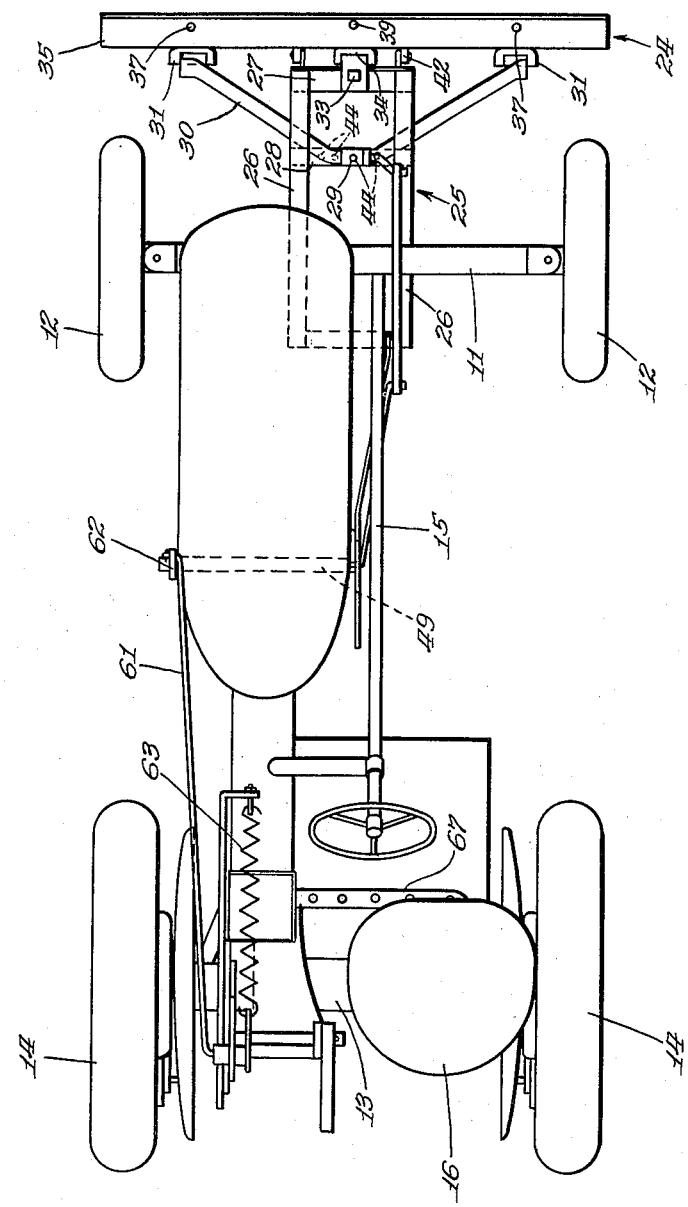
Figure 2 is a plan view of the structure shown in Figure 1 with all of the tractor wheels in position.
Figure 3:
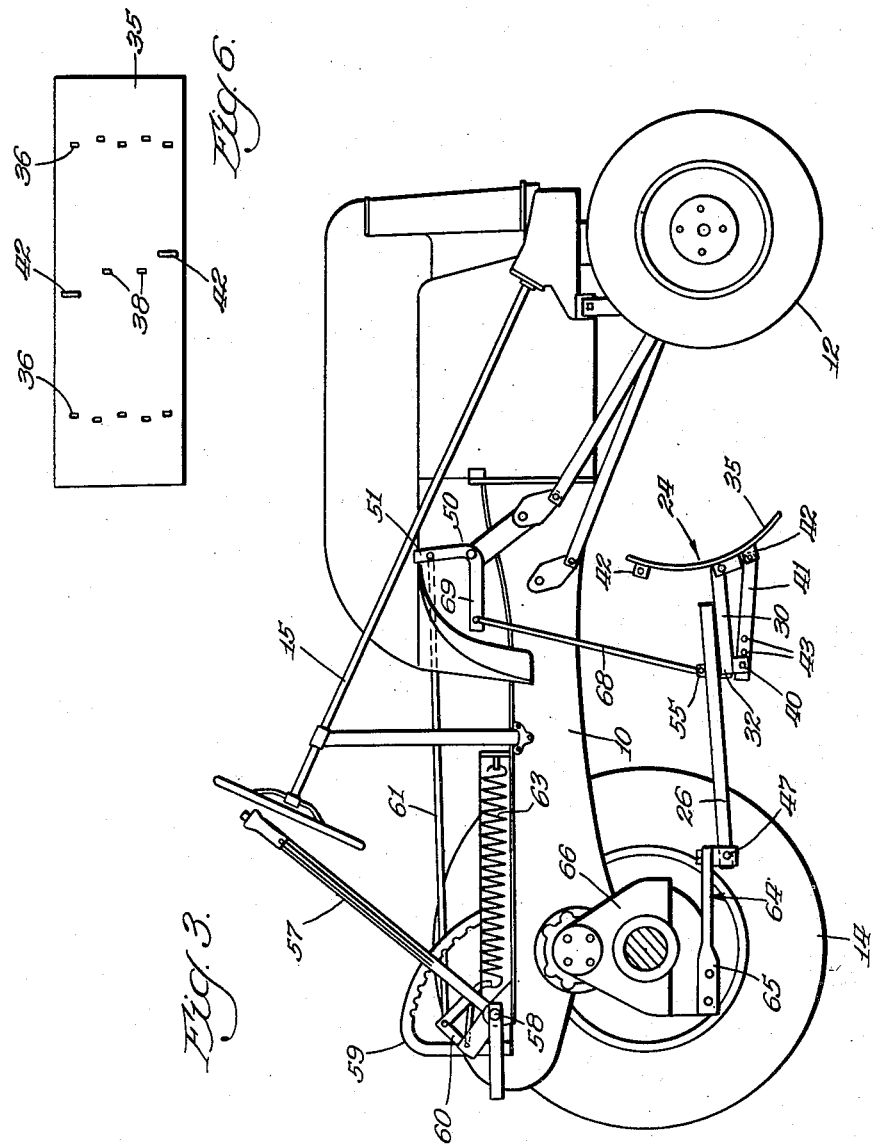
Figure 3 is a side elevation partly in section of the implement shown in Figure 1 with the scraping blade mounted between the front and rear wheels of the tractor to function as a grader and with one rear wheel of the tractor removed.
Figure 4:
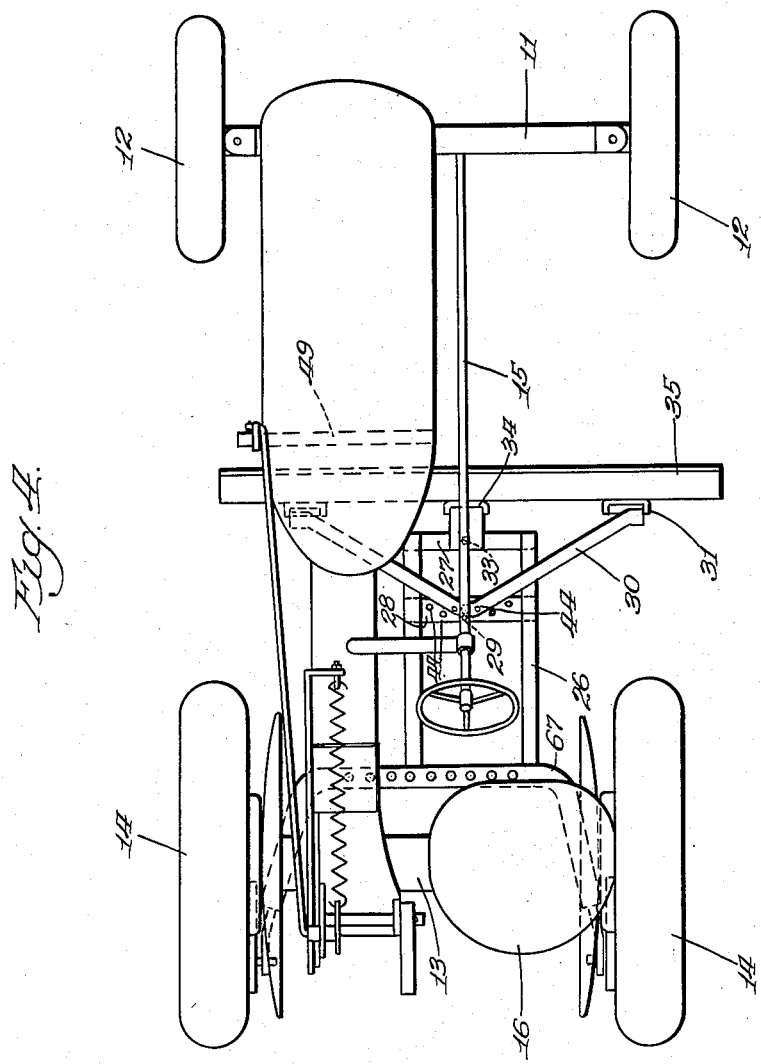
Figure 4 is a plan view of the structure shown in Figure 3 with all of the tractor wheels in position.

Referring to the drawings, the numeral 10 designates the longitudinally extending body of a tractor having a transverse front axle structure 11, laterally spaced front wheels 12, a transverse rear axle structure 13, and laterally spaced rear drive wheels 14. The tractor is provided with steering mechanism 15 and an operator's seat 16 shown in Figures 2 and 4.

Figure 1:
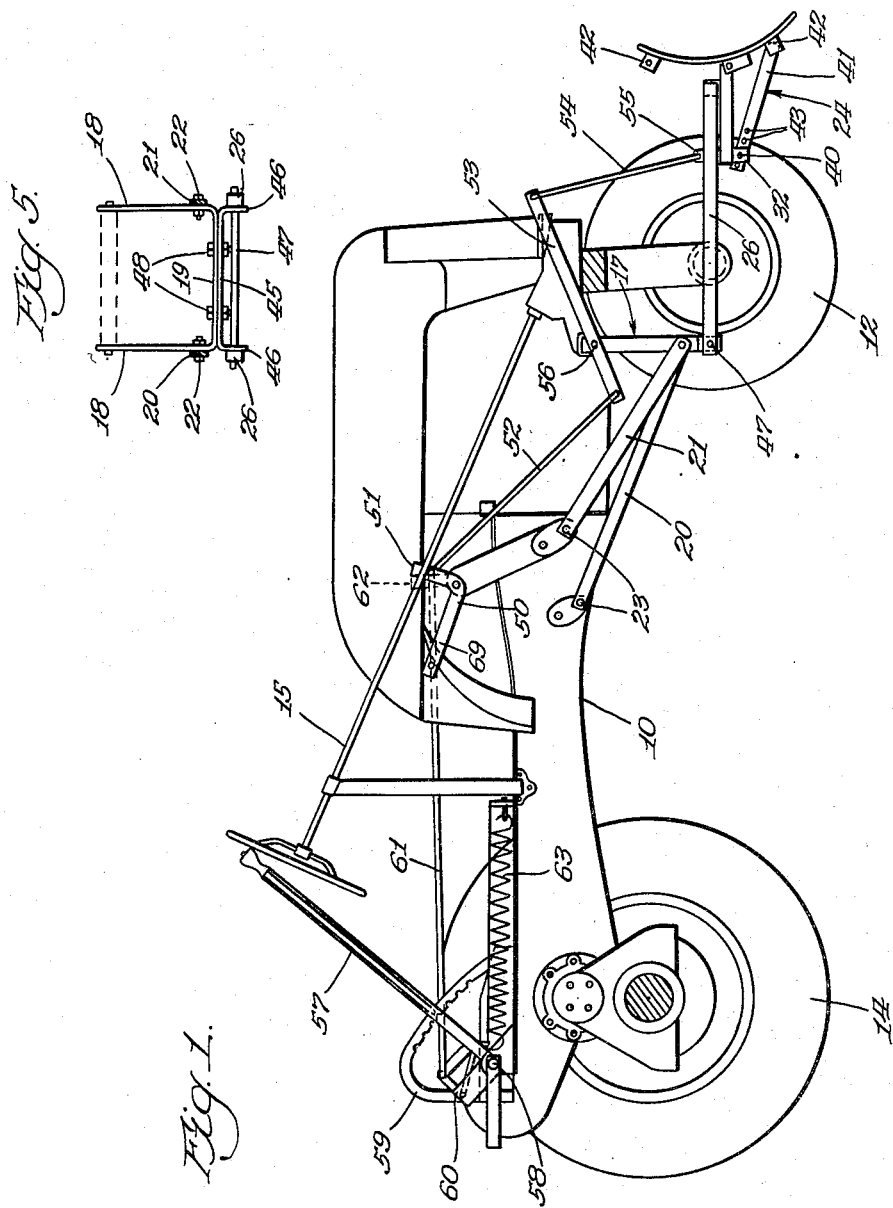
Figure 1 is a view in side elevation of a tractor, partly in section, with one front and one rear wheel removed having mounted thereon an implement embodying the features of the present invention and showing the scraping blade positioned in advance of the tractor.

Referring particularly to Figure 1, it will be noted that there is rigidly secured to the tractor body adjacent the front wheels 12 and rearwardly of the front axle structure 11 a draft member in the form of a depending bracket 17 shown in detail in Figure 5 and comprising a U-shaped member having arms 18 and a transverse portion 19. Bracket 17 is braced by a pair of straps 20 and 21, the forward ends of which are secured by bolts 22 to the lower portions of arms 18. The rear ends of the straps are affixed by bolts 23 to the body 10 of the tractor.

Bracket 17 serves for the attachment to the tractor of an implement 24 in the form of an earth scraper comprising a rectangular frame 25 formed of side bars 26 connected at their forward ends by a brace 27 and rearwardly thereof by a brace 28. Brace 28 has pivotally mounted thereupon by means of a pin 29 a U-shaped bracket 30 having pivotally connected thereto at laterally spaced locations plates 31. The forward brace 27 has pivoted thereto at 33 a plate 34 similar to plates 31 and located therebetween. These plates 31 and 34 serve as attaching means for a scraper blade 35. Blade 35 is arcuate in shape and as shown in Figure 6 is provided adjacent each end with a plurality of vertically spaced openings 36. These openings 36 are adapted to receive bolts 37 by which the blade 35 is connected to the plates 31. Additional openings 38 are provided centrally of the blade 35 for the attachment of the blade to the plate member 34 by means of a bolt 39.

Secured to a lug 32 by a bolt 40 is the rear end of a link 41, the forward end of which is pivotally connected to a lug 42 affixed to the rear surface of the blade 35. A plurality of openings 43 is provided in the link 41 so that the pitch of the blade 35 may be adjusted by inserting the bolt 40 in a selected one of the openings 43, thus rocking the blade about the pivotal connection thereof to the U-shaped member 30 and the brace 27. The blade 35 may likewise be tilted about a longitudinal axis by passing the bolts 37 through optional of the openings 36 in the blade. By the provision of a plurality of openings 44 in the brace 28 to receive the pin 29, the blade 35 and the supporting member 30 may be adjusted to various angles about a vertical axis represented by pivot 33.

It will be noted that the rectangular frame 25 extends below the transverse front axle 11 between the front wheels 12 and to a position in advance of the tractor and is pivotally connected at its rear end to the bracket 17. This pivotal connection is provided by means including a transversely extending member 45 having its ends bent downwardly to form ears 46. The member 45 is mounted upon a transversely extending pivot pin 47 which extends through the ears 46 and through the rear ends of side bars 26 of the rectangular frame 25. Member 45 is secured to the transverse portion 19 of bracket 17 by means of bolts 48. Vertical swinging movement of the implement 24 about the pivot pin 47 as an axis is accomplished by lifting mechanism which includes a transverse rock shaft 49 mounted upon the tractor body and having secured to one end thereof a bell crank 50 having an arm 51 connected by a rod 52 with one end of a link 53, the other end of which is connected by a rod 54 with a lug 55 carried by the frame 25 of the implement. Link 53 is fulcrumed medially of its ends at 56 upon the upper end of the bracket member 17. By rocking the bell-crank 50 in a clockwise direction as viewed in Figure 1 for example, the link 53 will be rocked in an anti-clockwise direction about its pivot 56 to raise the scraper blade about the axis represented by pivot pin 47. Rocking of the shaft 49 and of bell-crank 50 is accomplished by suitable conventional power applying mechanism such as the lever 57 pivoted at 58 upon a quadrant 59. Lever 57 is provided with an arm 60 suitably connected by a rod 61 with a rock arm 62 mounted upon the opposite end of shaft 49 from the bell-crank 50. A helper spring 63 is provided to assist the lever 57 when it is manipulated to lift the implement 24.

When it is desired to utilize the implement 24 as a grader, the link 54 is disconnected from the lug 55 and the bolts 48 holding member 45 to bracket 17 are withdrawn. The implement is then placed transversely beneath the tractor and the member 45 is connected by the bolts 48 to a draft member in the form of a reversed draw-bar 64. Draw-bar 64 is a U-shaped member having arms 65 secured to the depending axle housings 66 of the tractor at opposite sides of the body 10 and is provided with a transverse portion 67 having openings therein by which the member 45 is secured thereto. Drawbar 64 is reversible; that is, its position may be changed so that its transverse attaching portion 67 may extend rearwardly of the tractor for the attachment of trailing implements.

Vertical movement of the implement 24 about the pivot pin 47 as an axis in this latter position is accomplished by a link 68 connected to an arm 69 of the bell-crank 50 and to the lug 55 upon the implement frame 25. If desired, of course, the link 52 by release thereof from the arm 51 and link 53 may be utilized to lift the implement in its new position. Inversion of the blade 35 may be readily accomplished in order to utilize either cutting edge thereof by removing the bolts 37 and 39, disconnecting link 41 from the lug 42 and simply reversing the blade and again connecting the blade by means of the bolts 37 and 39. A second lug 42 is provided for the attachment of the link 41 in the new position of the blade.

It is believed that the operation of the implement of the present invention will be clearly understood from the foregoing description. It will also be understood that an implement attachment has been provided for a tractor which may be utilized either in advance of the tractor or between the front and rear wheels thereof to perform different earth moving functions. It should likewise be understood that the invention has been described in its preferred embodiment and that modifications may be made therein without departing from the spirit of the invention or the scope of the appended claims.

What is claimed is:

1. The combination with a tractor having a longitudinally extending body, front and rear wheels, and lift means at the side thereof, of an implement attachment including attaching mechanism for optionally mounting the implement on the tractor between the front and rear wheels or in advance of the front wheels, said lift means comprising a bell crank fulcrumed on the side of the tractor, means for rotating said bell crank, and a lift link connecting the bell crank to the implement, said link being connectable to one arm of the crank in one position of the implement and to the other arm of the bell crank in the other position of the implement.

2. The combination with a tractor having a longitudinally extending body, front and rear wheels, and lift means at the side thereof, of an implement attachment including attaching mechanism for optionally mounting the implement on the tractor between the front and rear wheels or in advance of the front wheels, said lift means comprising a bell crank fulcrumed on the side of the tractor, means for rotating said bell crank in one direction, a lift link connectable between one arm of the bell crank and the implement in one position thereof and adapted to exert a pulling force to lift the latter, a rockable member on the tractor operatively connectable to the implement in the other position thereof, said link being optionally connectable between the other arm of the bell crank and said rockable member and adapted to exert a thrust to rock the latter in a direction to lift the implement.

References Cited in the file of this patent

UNITED STATES PATENTS

| Number | Name | Date |
|---|---|---|
| 1,701,708 | Glaicar et al. | Feb. 12, 1929 |
| 1,974,190 | Miller | Sept. 18, 1934 |
| 2,147,193 | Durr | Feb. 14, 1939 |
| 2,213,635 | Miller et al. | Sept. 3, 1940 |
| 2,264,575 | Knapp et al. | Dec. 2, 1941 |
| 2,307,655 | Arps | Jan. 5, 1943 |
| 2,310,396 | Clinkscales | Feb. 9, 1943 |
| 2,339,518 | Reisser | Jan. 18, 1944 |
| 2,361,122 | Raney et al. | Oct. 24, 1944 |
| 2,426,410 | Owen | Aug. 26, 1947 |
| 2,433,019 | Arps | Dec. 23, 1947 |